(12) United States Patent
Wuerthinger (10) Patent No.: US 9,229,697 B2
(45) Date of Patent: Jan. 5, 2016

(54) SPECULATIVE OBJECT SHAPES

(71) Applicant: Oracle International Corporation, Redwood Shores, CA (US)

(72) Inventor: Thomas Wuerthinger, Utzenaich (AT)

(73) Assignee: Oracle International Corporation, Redwood Shores, CA (US)

(*) Notice: Subject to any disclaimer, the term of this patent is extended or adjusted under 35 U.S.C. 154(b) by 256 days.

(21) Appl. No.: 13/931,475

(22) Filed: Jun. 28, 2013

(65) Prior Publication Data

US 2015/0007151 A1   Jan. 1, 2015

(51) Int. Cl.
*G06F 9/45* (2006.01)
*G06F 9/455* (2006.01)

(52) U.S. Cl.
CPC ........ *G06F 8/443* (2013.01); *G06F 8/41* (2013.01); *G06F 8/433* (2013.01); *G06F 9/4552* (2013.01); *G06F 9/45508* (2013.01)

(58) Field of Classification Search
None
See application file for complete search history.

(56) References Cited

U.S. PATENT DOCUMENTS

| | | | | |
|---|---|---|---|---|
| 5,933,635 | A * | 8/1999 | Holzle et al. | 717/151 |
| 6,518,979 | B1 * | 2/2003 | Spertus et al. | 715/762 |
| 7,681,015 | B2 * | 3/2010 | Busck et al. | 712/216 |
| 2006/0026566 | A1 * | 2/2006 | Cabillic et al. | 717/118 |
| 2006/0090063 | A1 * | 4/2006 | Theis | 712/239 |
| 2009/0158248 | A1 * | 6/2009 | Linderman et al. | 717/106 |
| 2009/0235251 | A1 * | 9/2009 | Li et al. | 718/100 |
| 2010/0275187 | A1 * | 10/2010 | Mercer et al. | 717/140 |
| 2012/0072890 | A1 * | 3/2012 | Bosworth et al. | 717/141 |
| 2013/0067441 | A1 * | 3/2013 | Lafreniere et al. | 717/139 |
| 2013/0173632 | A1 * | 7/2013 | Birdwell et al. | 707/743 |
| 2013/0205285 | A1 * | 8/2013 | Pizlo | 717/151 |
| 2014/0101278 | A1 * | 4/2014 | Raman et al. | 709/213 |
| 2014/0137130 | A1 * | 5/2014 | Jacob et al. | 718/103 |

OTHER PUBLICATIONS

Console, C., Pu, C., Walpole, J., "Incremental Partial Evaluation: The Key to High Performance, Modularity and Portability in Operating Systems,"In Proceedings of the Symposium on Partial Evaluation and Semantics-Based Program Manipulation, Jan. 1993, 3 pages.

Deutsch, L., Schiffman, A., "Efficient Iimplementation of the Smalltalk-80 System", Proceeding POPL '84 Proceedings of the 11th ACM SIGACT-SIGPLAN symposium on Principles of programming languages, Jan. 1, 1984, 6 pages.

da Silva, A., Costa, V., "An Experimental Evaluation of JAVA JIT Technology", Journal of Universal Computer Science, vol. 1, No. 7, Jul. 28, 2005, 19 pages.

* cited by examiner

*Primary Examiner* — Jue Louie
*Assistant Examiner* — Roberto E Luna
(74) *Attorney, Agent, or Firm* — Osha Liang LLP (57) ABSTRACT

A method for speculative object shapes comprises obtaining values for objects of a first and second shape, determining, by a processor and during runtime, a first speculative type for the first value and a second speculative type for the second value, generating, based on the first speculative type and the second speculative type, a shape tree comprising a first subtree for the first shape and a second subtree for the second shape, marking, by the processor, the first subtree as obsolete based on a determination that the first speculative type is incorrect and that the second shape is a super shape of the first shape, and transforming, in response to marking, the first object from the first shape to the second shape by: merging the first subtree into the second subtree.

17 Claims, 5 Drawing Sheets

SPECULATIVE OBJECT SHAPES

CROSS-REFERENCE TO RELATED APPLICATIONS

The present application contains subject matter that may be related to the subject matter in U.S. patent application Ser. No. 13/731,698, filed on Dec. 31, 2012, and entitled "SELF-OPTIMIZING INTERPRETER AND SNAPSHOT COMPILATION," which is assigned to a common assignee and is incorporated by reference in entirety.

BACKGROUND

In general, programmers seek the most efficient way to execute their code, whether the code is executed using an interpreter, compiler, or both. An interpreter is a program that is capable of executing source code. A compiler transforms the source code into another form, such as machine code, which is then executed. When the code is transformed, an interpreter is often not required for execution. Each choice has advantages and disadvantages.

SUMMARY OF INVENTION

In general, in one or more embodiments, the invention relates to a method for speculative object shapes, comprising: obtaining a first value for a first object and a second value for a second object, wherein the first object is of a first shape, and wherein the second object is of a second shape; determining, by a processor and during runtime, a first speculative type for the first value and a second speculative type for the second value; generating, based on the first speculative type and the second speculative type, a shape tree comprising a first subtree for the first shape and a second subtree for the second shape; marking, by the processor, the first subtree as obsolete based on a determination that the first speculative type is incorrect and that the second shape is a super shape of the first shape; and transforming, in response to marking, the first object from the first shape to the second shape by: merging the first subtree into the second subtree.

In general, in one or more embodiments, the invention relates to a non-transitory computer-readable medium (CRM) storing a plurality of instructions for speculative object shapes, the plurality of instructions comprising functionality to: obtain a first value for a first object and a second value for a second object, wherein the first object is of a first shape, and wherein the second object is of a second shape; determine, during runtime, a first speculative type for the first value and a second speculative type for the second value; generate, based on the first speculative type and the second speculative type, a shape tree comprising a first subtree for the first shape and a second subtree for the second shape; mark the first subtree as obsolete based on a determination that the first speculative type is incorrect and that the second shape is a super shape of the first shape; and transform, in response to marking, the first object from the first shape to the second shape by: merging the first subtree into the second subtree.

In general, in one or more embodiments, the invention relates to a system for speculative object shapes, comprising: a computing device comprising a computer processor; and an interpreter executing on the computing device, and configured to: obtain a first value for a first object and a second value for a second object, wherein the first object is of a first shape, and wherein the second object is of a second shape; determine, during runtime, a first speculative type for the first value and a second speculative type for the second value; generate, based on the first speculative type and the second speculative type, a shape tree comprising a first subtree for the first shape and a second subtree for the second shape; mark the first subtree as obsolete based on a determination that the first speculative type is incorrect and that the second shape is a super shape of the first shape; and transform, in response to marking, the first object from the first shape to the second shape by: merging the first subtree into the second subtree.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for speculative object shapes. Objects are created, and values assigned to them, at run time from instructions obtained from source code. Additionally, the types of the values are speculatively defined and a shape tree is generated. Subsequently, if a speculative type is determined to be incorrect, the shape of the object that includes the incorrect type is marked as obsolete on the shape tree, and the subtree associated with the now-obsolete shape is merged into the subtree of a related, non-obsolete shape.

Throughout the detailed description references may be made to typing and/or type systems for programming languages. In memory, a value (i.e., "3," "yes," "6.789," etc.) is represented as a bit pattern (i.e., a series of zeros and ones). The type of the value tells the machine how to interpret this bit pattern. For example, two identical bit patterns may be differentiated based on their type: one may be a LONG and the other a DOUBLE. In this example, the computing device differentiates the two based on the type, as the bit patterns are identical. Many different components of a program may have a type and, as such, the invention should not be limited to the above examples. The way typing is implemented may vary from one programming language to another. As a simplified explanation, typing may be done statically, at compile time, or dynamically, at runtime. Some programming languages use a combination of both static and dynamic typing. One or more embodiments of the invention are directed to dynamically typed languages. Additionally, one or more embodiments of the invention may be used in statically typed languages.

Figure 1A:
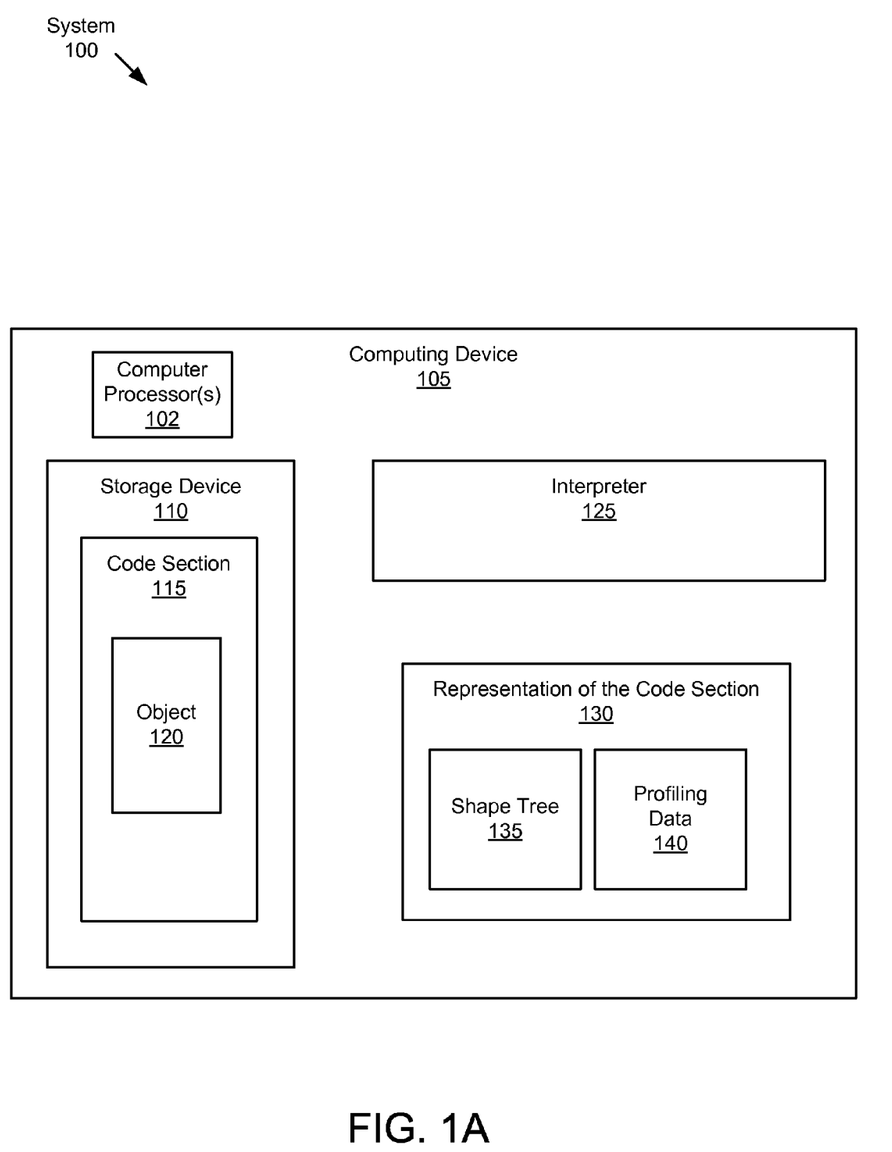
FIG. 1A shows a schematic diagram in accordance with one or more embodiments of the invention.

FIG. 1 shows system (100), which includes computing device (105), one or more computer processors (102), storage device (110), code section (115), object (120), interpreter (125), representation of the code section (130), shape tree (135), and profiling data (140). In one or more embodiments of the invention, computing device (105) may be any computing device including, but not limited to: a personal computer, a laptop, a server, a rack, a cable box, a smart phone, and/or any other suitable device. Further, in one or more embodiments of the invention, computing device (105) may be a distributed computing system, and may have one or more wired or wireless network connections (not shown).

In one or more embodiments of the invention, computing device (105) includes computers processor(s) (102). The computer processor(s) (102) may be an integrated circuit for processing instructions. For example, the computer processor (s) may be one or more cores, or micro-cores of a processor. In one or more embodiments of the invention, computing device (105) also includes storage device (110). Storage device (110) may be any type of storage device using any storage system including, but not limited to: hard drives, memories, removable storage media such as a flash drive, and/or any other suitable storage device. Storage device (110) may be located on computing device (105). Alternatively, storage device (110) may be remotely located and accessed using, for example, a network connection. Storage device (110) includes code section (115) and object (120).

In one or more embodiments of the invention, code section (115) is a source code file, or portion thereof, that will be executed. Code section (115) may be in any programming language now known or later developed. In one or more embodiments of the invention, code section (115) may include multiple files and/or multiple programming languages, and may be of any size. Alternatively, code section (115) may include a single file in a single programming language. It will be apparent to one of ordinary skill in the art, having the benefit of this disclosure, that code section (115) may be configured in many different ways and, as such, should not be limited to the above examples. Code section (115) includes at least one object (120).

In one or more embodiments of the invention, object (120) is a data structure, variable, or function as identified by code section (115). More generally, object (120) is a value in a location in memory referenced by an identifier, such as a pointer. There may be any number of objects (120) in code section (115), from zero to millions or more. In one or more embodiments of the invention, each object includes a set of values plus a pointer to exactly one shape. Shape is a representation of the properties of an object, and gives meaning to the values of the objects. In one or more embodiments of the invention, while not identical, a shape may be thought of as a class that is dynamically inferred at runtime, and may evolve. In other words, in order for an object to be "understood" by the computing device, the object is interpreted in view of the corresponding shape of the object. More specifically, a shape is defined by a set of tuples. Each tuple includes a key, a type, and a valueLocation. The key is the identifier of the property, the type is a type (i.e., INT, DOUBLE, LONG, etc.), and valueLocation specifies where in the object to find the value of the associated property (i.e., the property identified by the key). Frequently, a single shape is referenced by multiple objects. However, a single shape may be referenced by only one object. It will be apparent to one of ordinary skill in the art, having the benefit of this disclosure, that an advantage of shapes is that shapes enable objects to be grouped and treated equally.

When code section (115) is in a dynamic language, object (120) may change shape at runtime. That is, the shape of object (120) is not known until the object is actually used, although speculations may be made about the shape/types of object (120), as explained below. Further, because object (120) is defined by program code in code section (115), a location (i.e., a line of code) may be identified where object (120) is created. During runtime, object (120) may be represented in memory in many different ways. In one or more embodiments of the invention, interpreter (125) is any kind of interpreter for any programming language now known or later developed. Interpreter (125) includes functionality to translate code section (115) into an intermediate representation (i.e., representation of the code section (130)) and execute the intermediate representation. Alternatively, interpreter (125) includes functionality to directly execute code section (115), or may execute previously compiled code. Further still, interpreter (125) includes functionality execute code using some combination of the above methods, and/or any other method now known or later developed.

Turning briefly to the representation, in one or more embodiments of the invention, representation of the code section (130) is generated by interpreter (125). Alternatively, representation of the code section (130) may be generated by any other suitable component or module. Representation of the code section (130) may take many different forms including, but not limited to: abstract syntax trees (AST), graphs, flows, and/or any other suitable form. In one or more embodiments of the invention, representation of the code section (130) includes shape tree (135) and profiling data (140).

In one or more embodiments of the invention, shape tree (135) is a tree that is generated during runtime, which represents the shapes of the various objects of the program. In one or more embodiments of the invention, the root node of shape tree (135) is empty. Thus, all shapes in shape tree (135) share at least the root node. Further, each node in the shape tree (135) adds a property to the shape or shapes with which the node is associated.

In one or more embodiments of the invention, as shape tree (135) is constructed, various properties and/or relationships may emerge amongst the shapes. In particular, one property is whether a shape is a super shape or a sub shape of another shape. Generally, a shape, S, is a super shape of another shape, T, if an object of shape T can be transformed to having shape S without losing any information. Inversely, shape T is then a sub shape of shape S. In more detail, for a shape to be a super shape of another shape, the super shape must include for every tuple (key, type, valueLocation) a specific tuple (key1, type1, valueLocation1) where key1=key, and type1 is a super type of type, and the super shape must not contain any other tuples.

Figure 1B:
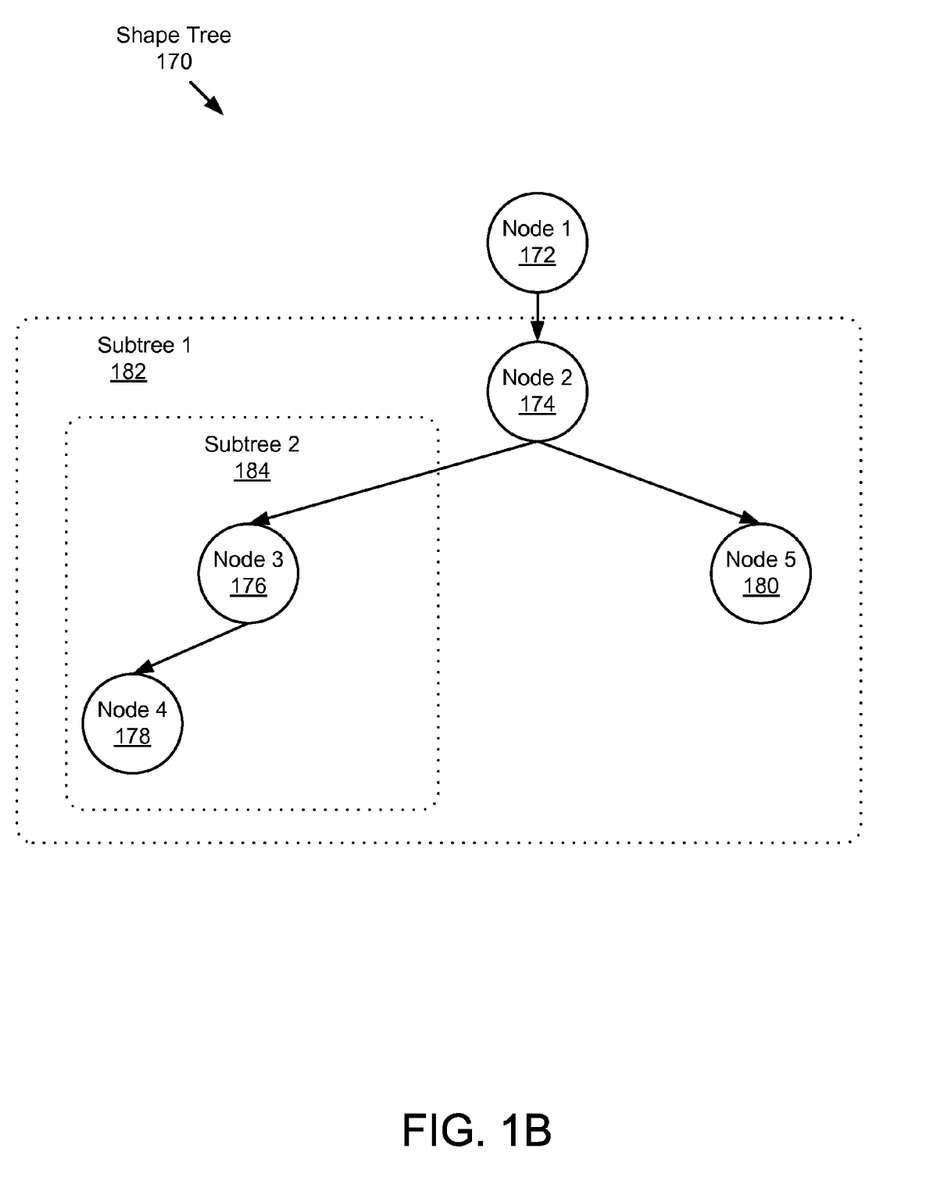
FIG. 1B shows a diagram of a shape tree in accordance with one or more embodiments of the invention.

A shape tree is explained briefly in FIG. 1B. Specifically, FIG. 1B shows shape tree (170) which includes, node 1 (172), node 2 (174), node 3 (176), node 4 (178), and node 5 (180). Various relationships between the nodes exist as shown in shape tree (170). Specifically, node 1 (172) is the first node of shape tree (170), which is also known as the root node of shape tree (170). Node 1 (172) does not have a parent node, as it is the first node. Node 2 (174) is a child of node 1 (172), and node 1 (172) is the parent of node 2 (174). Likewise, node 3 (176) and node 5 (180) are children of node 2 (174), and node 2 (174) is the parent node of node 3 (176) and node 5 (180). Additionally, node 3 (176) and node 5 (180) are siblings. Likewise, node 4 (178) is the child of node 3 (176), who is also the parent of node 4 (178). In one or more embodiments of the invention, node 2 (174) may add a property to the overall shape of an object, as would each of the other nodes. In other words, a child node adds a property for the shape of one or more objects to the parent node and any preceding nodes. In other words, a child node and any preceding parent nodes represents a shape or partial shape of one or more objects. Thus, a shape that includes nodes 1 through 4 would include, at most, four different attributes, while a shape including nodes 1, 2, and 5, would have, at most, three different attributes in accordance with one or more embodiments of the invention. Child nodes that are sibling nodes (e.g., node 3 (176) and node 5 (180)) reflect a divergence in shapes. In other words, node 3 (176) adds a property to a shape that is not present in the shape represented by node 5 (180). Similarly, node 5 (180) adds a property to a shape that is not present in the shape represented by node 3 (176). However, the shapes represented by node 3 (176) and node 5 (180) overlap with respect to the property of node 2 (174).

A shape tree may include any number of subtrees, which include a node of the tree and all descendents of the node. For example, subtree 1 (182) includes node 2 (174) as the root node of subtree 1 (182), and all descendents of node 2 (174), node 3 (176), node 4 (178), and node 5 (180). Likewise, subtree 2 (184) includes node 3 (176) as the root node of the subtree, and all descendents of node 3 (176), and node 4 (178). In one or more embodiments, subtree 1 (182) may represent a shape. It will be apparent to one of ordinary skill in the art, having the benefit of this disclosure, that FIG. 1B merely shows a generic tree structure of a shape tree and that trees may come in many different sizes, shapes, types, and structures and, thus, the invention should not be limited to the above example.

Returning to FIG. 1A, in one or more embodiments of the invention, profiling data (140) are metrics gathered during execution of the code (i.e., at runtime). Profiling data (140) may include, but is not limited to: the number of times a unit of code (e.g., a node, a loop, a method, etc.) has been executed, how recently representation of the code section (130) (or a portion thereof) has been dynamically changed, the actual values, value ranges, and/or types of inputs given to an operation at runtime, etc. In one or more embodiments of the invention, profiling data (140) may be used to aid in speculating on the type or value of an object and/or property.

Returning now to interpreter (125), interpreter (125) includes functionality to generate shape tree (135), and to speculate on the type of values assigned to a property and/or object. The speculative types may be stored in shape tree (135) by interpreter (125). Further, interpreter (125) includes functionality to detect a violation of a type (i.e., a speculation was incorrect), mark a subtree of shape tree (135) as obsolete and subsequently transform objects from obsolete shapes to non-obsolete shapes as necessary. For example, interpreter (125) may make the determination that a speculative type is incorrect when a property is assigned a new value, or at any other suitable point. In one or more embodiments of the invention, the transformation is done by merging the obsolete subtree with a related, non-obsolete subtree (i.e., merging the obsolete shape's subtree into the subtree of a shape that is a super shape of the obsolete shape).

Further, in one or more embodiments of the invention, interpreter (125) includes functionality to avoid polymorphism and/or reduce existing polymorphism. Polymorphism occurs when different types (i.e., string, int, double, etc.) may be used in the same method, function, interface, access point, etc. Finally, in one or more embodiments of the invention, interpreter (125) includes functionality to make effectively final speculations. A variable is final when the variable does not change. In other words, interpreter (125) may speculate not only on the type of a value, but may also speculate that the value is effectively final and will not change during execution. Specifically, when making effectively final speculations for a given object or variable, each key (i.e., identifier) may only be defined once and not later redefined with a new value, in one or more embodiments of the invention. Thus, if the value of the given object or variable were to change, a new key would be defined for the object or variable. Optionally, interpreter (125) may include functionality to implement effectively final speculation by introducing a "final" subtype (e.g. "final int" is a subtype of "int" and/or "final double" is a subtype of "double", etc.) and treating any assignment of a new value to a "final" subtype as an assignment of a value of an incorrect type, thereby triggering the shape obsoletion process, as explained below. It will be apparent to one of ordinary skill in the art that, having the benefit of this disclosure, that the functionalities of interpreter (125) may be spread across various modules (not shown) and may even be performed by different components (i.e., a compiler (not shown)) and, as such, the invention should not be limited to the description above.

Figure 2:
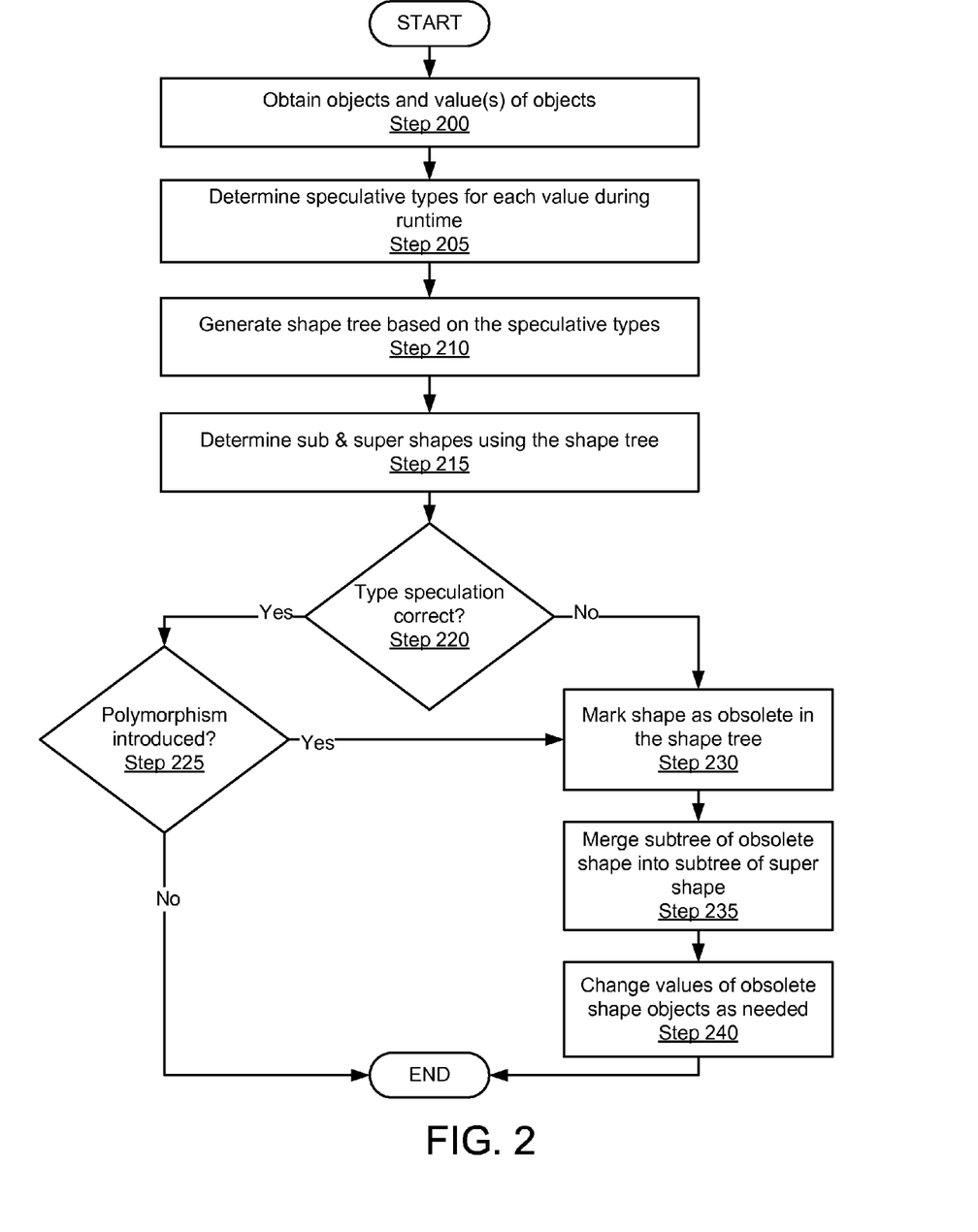
FIG. 2 shows a flowchart of a method in accordance with one or more embodiments of the invention.

FIG. 2 shows a flowchart of a method for speculative object shapes. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, objects and values of objects are obtained, in accordance with one or more embodiments of the invention. The objects and the values of the objects may be obtained in any manner now known or later developed. In one or more embodiments of the invention, the objects and the values of the objects may be obtained from a source code file by an interpreter. Specifically, in one or more embodiments of the invention, values are for the properties/variables that make up an object. The values may be obtained with or without a type, dependent on the programming language used. In one or more embodiments of the invention, while the interpreter is interpreting and executing the source code, the interpreter may encounter an object in the source code. At that time, if the shape of the object is already defined in the shape tree, then the interpreter may confirm that any type speculation is correct (as discussed below). If the shape of the object is not in the shape tree, then the interpreter adds the (new) shape of the object to the shape tree as discussed in Step 205 and 210 below. The interpreter may then continue processing the source code to continue confirming the type of existing objects or to add new shapes to the shape tree. Further, in one or more embodiments of the invention, Step 200 is performed at runtime. Alternatively, Step 200 may be performed before runtime by, for example, a compiler. In one or more embodiments of the invention, Step 200 (and any or all other steps) may be performed by the machine code produced by a compiler (or some combination of compiler and/or interpreter), rather than by the interpreter, as discussed above.

In Step 205, speculative types for each value are determined during runtime, in accordance with one or more embodiments of the invention. The types may be speculated on in any manner now known or later developed. The speculation may be based on any available information including, but not limited to: the code where the object was created, profiling information, and/or any other suitable information. For example, if a variable is assigned a value of "3," then the type may be speculated as an INT, since "3" fits the qualities of an INT. Step 205 may be done concurrently with Step 210, as the speculative types may be stored, for example, in the shape tree.

Optionally, in one or more embodiments of the invention, as well as speculating on types of values, speculation may occur that the value itself is effectively final (i.e., that the value does not change). This speculation is possible, and efficient, due to the extremely low cost of speculating using the method of this invention. The effectively final speculation may be used by avoiding loading a value when an object is constant and a shape check has been performed. In the event that the effectively final speculation is incorrect, the obsolescing process would be performed, as described below.

In Step 210, a shape tree is generated based on the speculative types, in accordance with one or more embodiments of the invention. The shape tree is generated at runtime, and may be generated in any manner now known or later developed. Further, the shape tree may be generated by any suitable module or component, such as an interpreter or compiler. For example, generating the shape tree may be performed as follows. When a new object is identified by the interpreter, or other suitable component such as a compiler, the shape of the object is searched for in shape tree. If found, shape tree is not updated. If, however, the shape of the identified object is new, then shape tree is expanded and/or updated. In other words, an existing node that represents the closest super shape of the shape is identified in the shape tree. A new node is added as a child of the existing node to reflect any additional properties to the shape. In one or more embodiments of the invention, the shape tree includes the speculative types for values, as determined in Step 205. Additionally, the shape tree may take any form or shape, and should not be limited to any configuration.

In one or more embodiments of the invention, the nodes of the shape tree are generated as objects are created, and various values/properties are assigned to the objects. Specifically, for each additional value and/or property assigned to a given object, the subtree representing the shape of that object receives another node(s). In one or more embodiments of the invention, one shape tree exists per program. Optionally, in one or more embodiments of the invention, the shape tree may be forked (i.e., generated with a separate branch or subtree) based on where the object is created in the source code. In other words, two otherwise identical objects A and B, may have separate subtrees in the shape tree based solely on the location where each object was created. In this embodiment, if additional polymorphism is introduced, one of the subtrees is marked as obsolete and merged into the other, as explained below with regards to Steps 230 and 235.

In Step 215, sub shapes and super shapes are determined using the shape tree, in accordance with one or more embodiments of the invention. The sub shapes and super shapes may be determined in any manner now known or later developed. The super shapes may be identified by determining whether a given shape defines exactly the same number of tuples, where the set of keys is exactly equal, as a second shape and for every tuple of the second shape the shape has a matching tuple except that the type is a super type. A type is a super type when the type is able to be converted into the super type without any loss of accuracy or data. In one or more embodiments of the invention, the sub shapes and super shapes are not determined until they are needed. That is, the sub and super shapes are determined when one or more shapes have been marked as obsolete.

In Step 220, a determination is made whether a type speculation was correct, in accordance with one or more embodiments of the invention. Specifically, Step 220 occurs during runtime, when the object or objects are used in the actual execution of the program. For example, a violation of a type speculation may be detected when a property is assigned a new value, and the new value does not fit the speculative type, or at any other suitable point. In other words, if a violation of the speculative type is noticed during runtime, the method proceeds to Step 230. Otherwise, if the speculative type(s) is correct, the method proceeds to Step 225.

In Step 225, a determination is made whether polymorphism is introduced, in accordance with one or more embodiments of the invention. Specifically, Step 225 is checking for unnecessary polymorphism that represents a trade-off between efficient representation of the objects and the polymorphism on access. In other words, Step 225 is checking for polymorphism that results even though the speculative types were not incorrect. In one or more embodiments of the invention, polymorphism is introduced when a shape, C, causes polymorphism with another shape, D, when D is a super shape of C. When this unnecessary polymorphism is detected, the sub shape (i.e., the shape that causes the unnecessary polymorphism) may be immediately marked as obsolete. Alternatively, the sub shape may be marked as obsolete after profiling has indicated that the polymorphism occurs enough that some threshold is exceeded. Thus, if polymorphism is not introduced, the method ends. If polymorphism is introduced, the method proceeds to Step 230.

In Step 230, a shape is marked as obsolete in the shape tree, in accordance with one or more embodiments of the invention. When a shape is marked as obsolete, the interpreter, or other suitable component, is indicating that the marked shape is not to be used any longer as a more efficient way exists to represent the shape of objects having the now-obsolete shape. The shape may be marked in any manner now known or later developed. In one or more embodiments of the invention, the entire subtree associated with the shape is marked as obsolete. Alternatively, a portion of the subtree may be marked as obsolete.

In Step 235, the subtree of the obsolete shape is merged into a subtree of a super shape, in accordance with one or more embodiments of the invention. The merge may be performed in any manner now known or later developed. In one or more embodiments of the invention, the merging process begins by finding the root node of the obsolete subtree represented by (key, type, valueLocation) and a sibling represented by (key1, type1, valueLocation1), where key1==key and type1 is a super type of type. Then, children of the root node are added as children of the sibling. The merge operation continues recursively for all children. The merge process determines the new type (i.e., the new type is the type for which the value needs to be converted to when the object is converted to the new shape, as explained in Step 240) for every value of an object with an obsolete shape. Step 235 may be performed immediately after a shape has been marked as obsolete. Alternatively, Step 235 may be performed after a subsequent access to the obsolete shape, or at any other time.

In Step 240, the representation of the values of the obsolete shape objects in memory are changed according to the new type, in accordance with one or more embodiments of the invention. The transformation may be performed lazily. That is, the values may be changed upon access/use, rather than converting in advance. Alternatively, the transformation may be performed when the new type is identified. In one or more embodiments of the invention, the "actual" value does not change. That is, a value of 5 would stay a value of 5 upon transformation, but, for example, if the transformation was from an INT to a DOUBLE, then the representation of "5" in memory may change according to the newly identified type. After Step 240 the method ends.

It will be apparent to one of ordinary skill in the art, having the benefit of this disclosure, that there are many variations of the present invention that may be implemented, and many different applications of the invention. In one or more embodiments of the invention, upon marking a shape as obsolete, the inline caches may be cleared of operations transforming objects into that shape to avoid that new objects of the obsolete shape appear. Further, it may be advantageous to prevent obsolete shapes from being created frequently, as the transformation of an object is an expensive operation. In one or more embodiments of the invention, if an object of an obsolete shape causes an inline cache miss, the object is transformed into the corresponding valid shape.

The following section describes various examples of the invention. The examples are included to aid in the understanding of the invention and are not intended to limit the scope of the invention.

Figure 3:
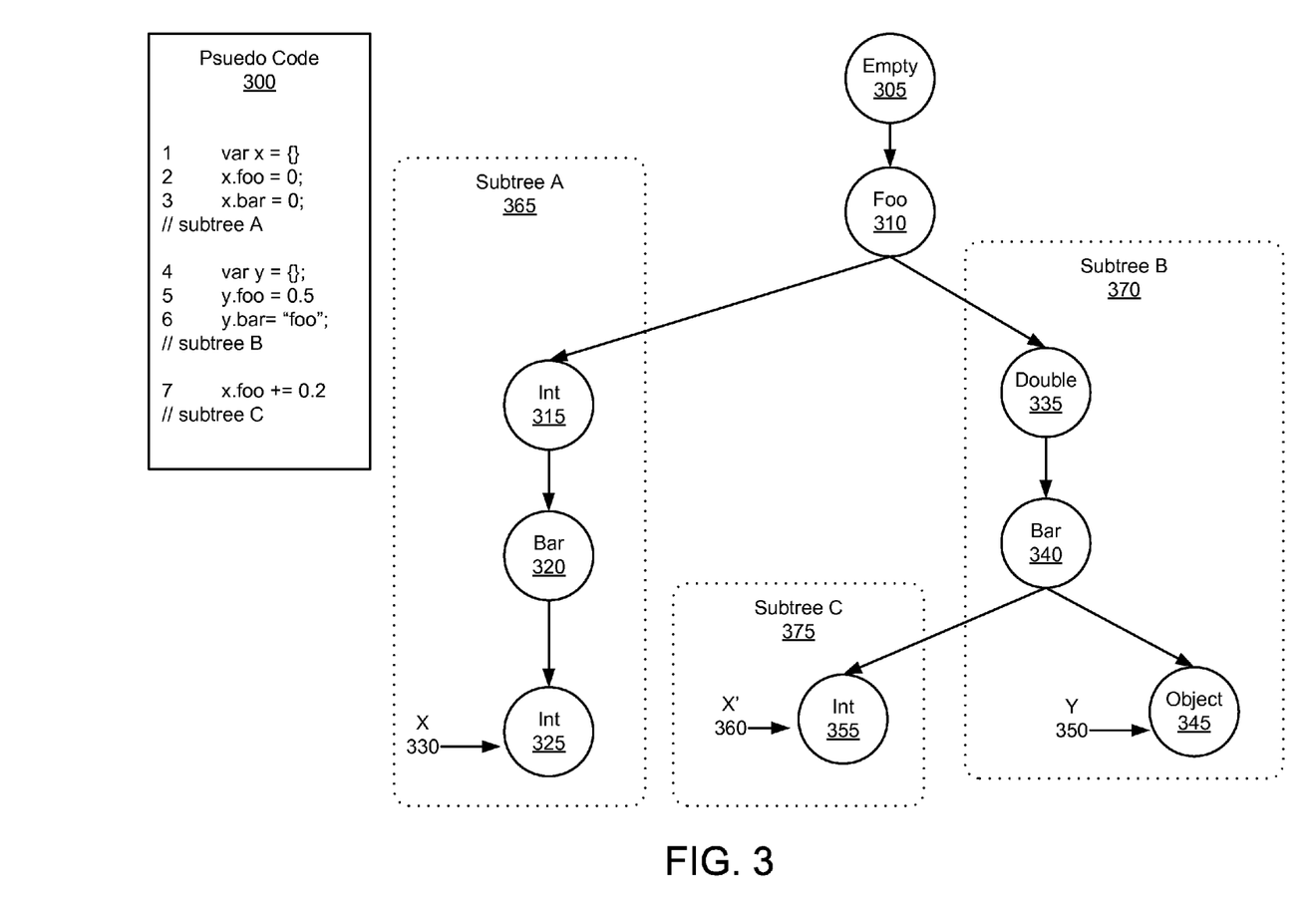
FIG. 3 shows an example in accordance with one or more embodiments of the invention.

FIG. 3 shows an example in accordance with one or more embodiments of the invention. Specifically, FIG. 3 shows pseudo code (300) and the resulting shape tree that is generated when code corresponding to the pseudo code (300) is executed. Initially, in the first line of pseudo code (300), the variable X is created, in accordance with one or more embodiments of the invention. Subsequently, in line 2 of pseudo code (300), x.foo is assigned a value of 0, and in line 3 of pseudo code (300), x.bar is assigned a value of 0. The resulting shape tree created by these three lines of code would include empty (305), foo (310), int (315), bar (320), and int (325). Of note in the shape tree, is that the types included in the shape tree are speculations. Specifically, int (315) and int (325) are speculations as to the type of their associated values (in this case 0 and 0, respectively). The variable X (330) in the shape tree is defined as (foo, int) (bar, int).

Subsequently, in lines 4 through 6 of pseudo code (300), variable Y is created, and values are assigned. A value of 0.5 is assigned to y.foo, while a value of "foo" is assigned to y.bar. The resulting shape tree created by these three lines of code include: empty (305), foo (310), double (335), bar (340), and object (345). Of note in the shape tree, is that the types included in the shape tree are speculations. Specifically, double (335) and object (345) are speculations as to the type of their associated values (in this case 0 and "foo," respectively). The variable Y (350) in the shape tree is defined as (foo, double) (bar, object).

Looking at the shape tree as it stands before line 7 of pseudo code (300), subtree A (365) represents the shape of X (330), while subtree B (370) represents the shape of Y (350). Of note is that subtree B (370) is a super shape of subtree A (365). Subtree B (370) is a super shape of subtree A (365), because subtree A (365) could be merged into subtree B (370) without losing any information, as an INT can easily be converted to a DOUBLE (i.e., int (315) into double (335)) and, while adding a lot of unnecessary space, an INT can be converted into an foo object (i.e., int (325) into object (345)). However, this can be simplified slightly, as shown below.

In line 7 of pseudo code (300), x.foo is increased by 0.2. This addition violates the speculation on the type of x.foo, because an INT cannot have a decimal value. The addition causes a data deoptimization, and subtree A (365) is marked obsolete. Subsequently, the shape of object X is transformed into the shape of object Y, so subtree A (365) and subtree B (370) are merged. This merger results in subtree C (375), which branches off from bar (340). Subtree C (375) includes int (355). Thus, after the merger, the shape of X' (360) is (foo, double) (bar, int).

Figure 4:
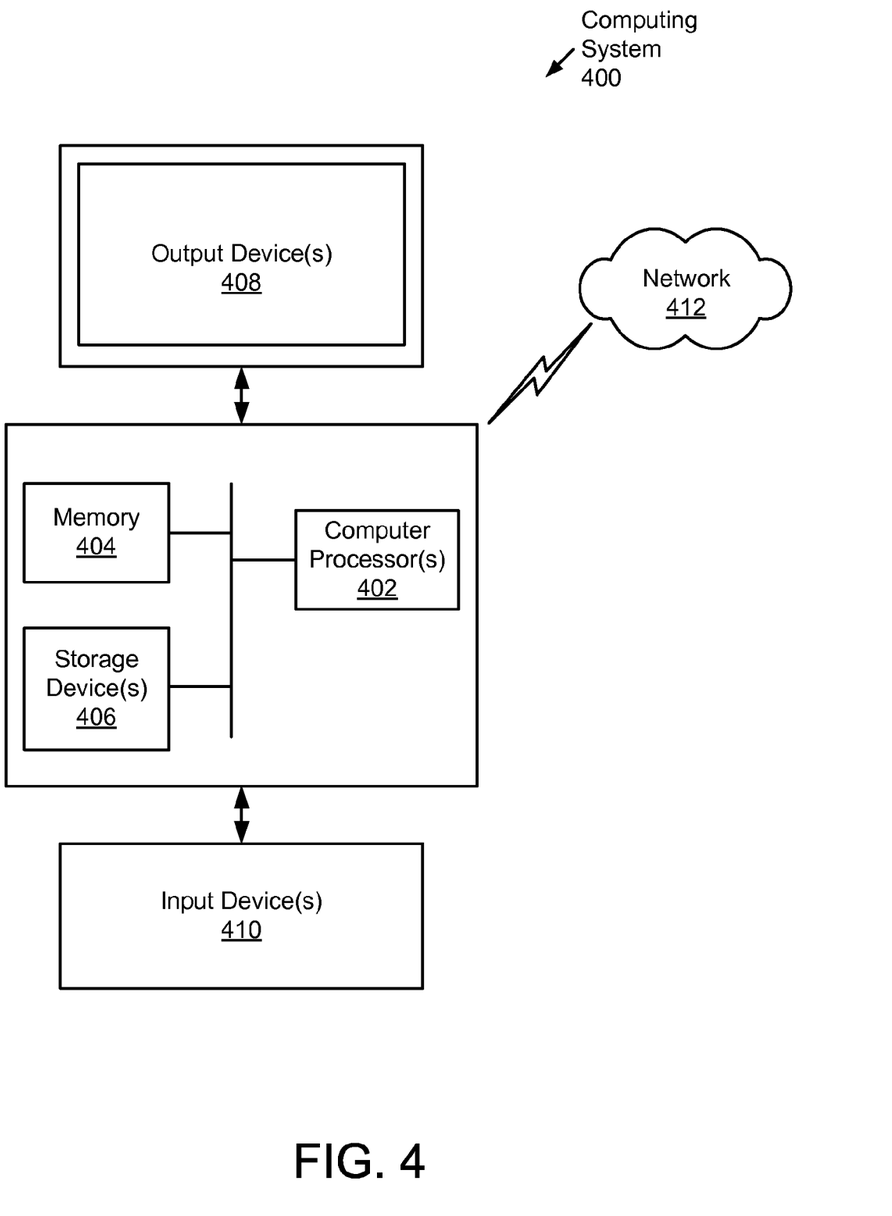
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for speculative object shapes, comprising:
obtaining a first value for a first object and a second value for a second object, wherein the first object is of a first shape, and wherein the second object is of a second shape;
determining, by a processor and during runtime, a first speculative type for the first value and a second speculative type for the second value;
generating, based on the first speculative type and the second speculative type, a shape tree comprising a first subtree for the first shape and a second subtree for the second shape;
marking, by the processor, the first subtree as obsolete based on a determination that the first speculative type is incorrect and that the second shape is a super shape of the first shape;
transforming, in response to marking, the first object from the first shape to the second shape by:
merging the first subtree into the second subtree;
obtaining a third value for a third object, wherein the third object is of a third shape;
determining, by the processor and during runtime, a third speculative type for the third value;
generating, based on the third speculative type, a third subtree for the shape tree; and
marking, in response to determining that the third shape causes polymorphism, the third subtree as obsolete based on a determination that the second shape is the super shape of the third shape and that the third shape causes polymorphism with the second shape,
wherein the third speculative type is correct.

2. The method of claim 1, wherein transforming further comprises:
changing the first value so that the first value is consistent with the second speculative type.

3. The method of claim 1, wherein the third object is transformed to the second shape when the third object is accessed.

4. The method of claim 1, further comprising:
obtaining a fourth value for a fourth object, wherein the fourth object is of the second shape; and
forking the shape tree based on a determination that a first code location where the third object is created is different than a second code location where the second object is created.

5. The method of claim 1, further comprising:
speculating that the first value is final.

6. The method of claim 1, wherein transforming the first shape into the second shape results in the first value staying equivalent.

7. A non-transitory computer-readable medium (CRM) storing a plurality of instructions for speculative object shapes, the plurality of instructions comprising functionality to:
obtain a first value for a first object and a second value for a second object, wherein the first object is of a first shape, and wherein the second object is of a second shape;
determine, during runtime, a first speculative type for the first value and a second speculative type for the second value;
generate, based on the first speculative type and the second speculative type, a shape tree comprising a first subtree for the first shape and a second subtree for the second shape;
mark the first subtree as obsolete based on a determination that the first speculative type is incorrect and that the second shape is a super shape of the first shape;
transform, in response to marking, the first object from the first shape to the second shape by:
merging the first subtree into the second subtree;
obtain a third value for a third object, wherein the third object is of a third shape;
determine, by the processor and during runtime, a third speculative type for the third value;
generate, based on the third speculative type, a third subtree for the shape tree; and
mark, in response to determining that the third shape causes polymorphism, the third subtree as obsolete based on a determination that the second shape is the super shape of the third shape and that the third shape causes polymorphism with the second shape,
wherein the third speculative type is correct.

8. The non-transitory CRM of claim 7, wherein transforming further comprises functionality to:
change the first value so that the first value is consistent with the second speculative type.

9. The non-transitory CRM of claim 7, wherein the third object is transformed to the second shape when the third object is accessed.

10. The non-transitory CRM of claim 7, further comprising:
obtain a fourth value for a fourth object, wherein the fourth object is of the second shape; and
fork the shape tree based on a determination that a first code location where the third object is created is different than a second code location where the second object is created.

11. The non-transitory CRM of claim 7, the instructions further comprising functionality to:
speculate that the first value is final.

12. The non-transitory CRM of claim 7, wherein transforming the first shape into the second shape results in the first value staying equivalent.

13. A system for speculative object shapes, comprising:
a computing device comprising a computer processor; and
an interpreter executing on the computing device, and configured to:
obtain a first value for a first object and a second value for a second object, wherein the first object is of a first shape, and wherein the second object is of a second shape;
determine, during runtime, a first speculative type for the first value and a second speculative type for the second value;
generate, based on the first speculative type and the second speculative type, a shape tree comprising a first subtree for the first shape and a second subtree for the second shape;
mark the first subtree as obsolete based on a determination that the first speculative type is incorrect and that the second shape is a super shape of the first shape;
transform, in response to marking, the first object from the first shape to the second shape by:
merging the first subtree into the second subtree;
obtain a third value for a third object, wherein the third object is of a third shape;

determine, by the processor and during runtime, a third speculative type for the third value;

generate, based on the third speculative type, a third subtree for the shape tree; and mark, in response to determining that the third shape causes polymorphism, the third subtree as obsolete based on a determination that the second shape is the super shape of the third shape and that the third shape causes polymorphism with the second shape, wherein the third speculative type is correct.

14. The system of claim 13, wherein transforming further comprises functionality to:

change the first value so that the first value is consistent with the second speculative type.

15. The system of claim 13, wherein the third object is transformed to the second shape when the third object is accessed.

16. The system of claim 13, the interpreter further comprising functionality to:

obtain a fourth value for a fourth object, wherein the fourth object is of the second shape; and fork the shape tree based on a determination that a first code location where the third object is created is different than a second code location where the second object is created.

17. The system of claim 13, the interpreter further comprising functionality to:

speculate that the first value is final.

* * * * *